Oct. 5, 1954   E. E. HUPP   2,690,740
POWER-ASSISTED MASTER CYLINDER
Original Filed April 12, 1952   2 Sheets-Sheet 1

INVENTOR.
Edward E. Hupp
BY G. A. Gust
ATTORNEY

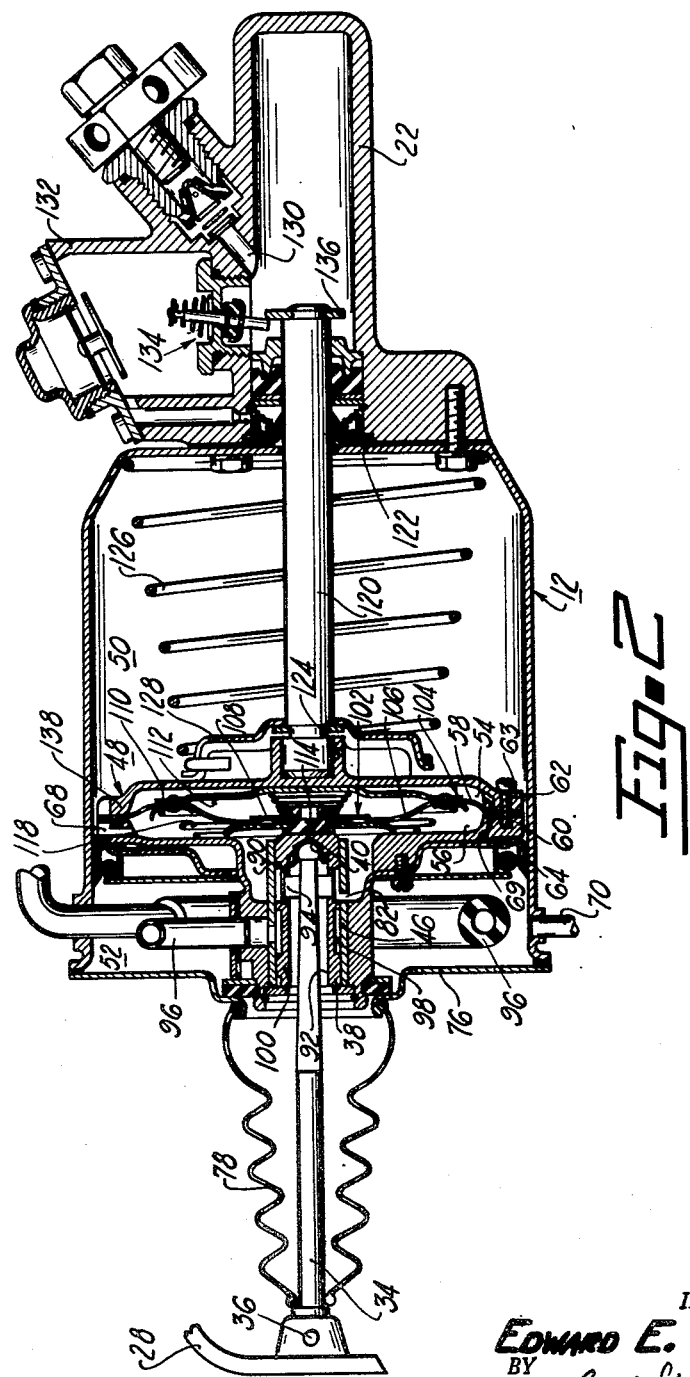

Patented Oct. 5, 1954

2,690,740

UNITED STATES PATENT OFFICE 2,690,740

POWER-ASSISTED MASTER CYLINDER

Edward E. Hupp, South Bend, Ind., assignor to Bendix Aviation Corporation, South Bend, Ind., a corporation of Delaware Continuation of application Serial No. 282,040, April 12, 1952. This application April 28, 1953, Serial No. 351,579

9 Claims. (Cl. 121—41)

This application is a continuation of Serial No. 282,040, filed April 12, 1952, now abandoned.

The present invention relates to an improvement in power-assisted actuators, i. e. pressure producing devices in which physical operating force is supplemented by power assistance. The improved actuator has been devised primarily for use in vehicle braking systems, although other uses are possible.

Specifically, this invention constitutes an improvement over the invention of Price application Serial No. 251,734, filed October 17, 1951, now abandoned, the subject matter being contained in the co-pending application Serial No. 411,386, filed on February 19, 1954. The device of the latter mentioned application embodies a reaction diaphragm construction novel in the respect that it provides two distinct, reaction areas which cooperate to provide a more natural braking "feel" for the operator when he applies the brakes.

One principal problem which has been encountered in the use of power-assisted brake devices is the provision of "feel" or "reaction" which corresponds favorably with that "feel" derived from the use of the conventional, manually operated braking systems which utilize a brake pedal for applying the brakes. While various expedients for providing "feel" have been proposed, and some adopted, a power-assisted brake device having a built-in reaction feature has not been, prior to the Price application Serial No. 251,734, designed for use on conventional automobiles, or passenger car vehicles, which would meet the requirements of industry in reliability, efficiency, economy, "feel," etc. In the use of the invention disclosed in the latter mentioned Price application, it has been discovered that the reliability and consistency of operation thereof could be improved by modifying the "reaction" diaphragm construction, this modification being both functionally and structurally different from that used before.

It is, therefore, a principal object of this invention to provide a power-assisted actuator for use in a vehicle braking system, which will improve the consistency and reliability of operation while at the same time convey to the operator a true and pleasant indication of the degree of the developed braking torque.

It is another object of this invention to improve the consistency of operation of the control valve mechanism used in a power-assisted brake device, and specifically to prevent the development of "flutter" or oscillation which may be felt by the operator.

A still further object of this invention is to provide an "anti-flutter" means which prevents the inducement of vibration in the reaction diaphragm which cooperates with the control valve in (a) transmitting a true "feel" to the operator and (b) controlling the operation of the power-assisted master cylinder device.

Other objects and advantages of this invention will become apparent from a consideration of the following description, taken in connection with the accompanying drawings, wherein an embodiment of this invention is disclosed by way of example.

In the drawings:

Figure 2 is a sectional view of the power-assisted master cylinder of Figure 1.

Figure 1:
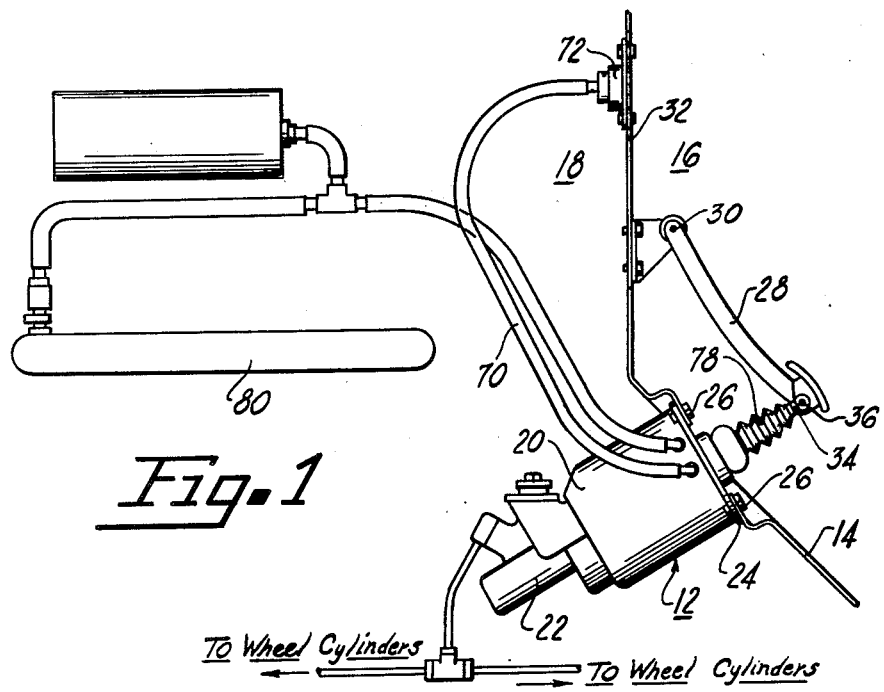
Figure 1 is a diagrammatic illustration showing a power-assisted master cylinder adapted for use in a vehicle braking system.

Referring to the drawings and more particularly to Figure 1, a power-assisted master cylinder unit 12 is secured directly to the engine compartment side of the toe-board 14, the toe-board being the slanting lower portion of the wall which separates the driver's compartment 16 from the engine compartment 18. The power-assisted master cylinder unit comprises a power cylinder 20 and a hydraulic cylinder 22 mounted on the front end of the power cylinder. The power cylinder casing has an integral mounting flange 24 which is secured, by means of fastening members 26, to the toe-board or any other convenient part of the vehicle.

The power-assisted master cylinder unit 12 is controlled by a treadle 28, which is pivoted at 30 on the driver's compartment side of the fire wall 32. The treadle may be pivoted at its lower end, similarly to a conventional accelerator treadle, if preferred. A control rod 34 is pivotally connected at 36 to the treadle 28, and extends into the power-assisted master cylinder unit to control its operation.

As shown in Figure 2, the right-hand end of rod 34 operatively engages a valve control member or plunger 38. The rod is connected to the plunger 38 by means of a C-shaped grip retainer 40 which clamps over the rounded right end of rod 34 and which is provided with outwardly inclined ends 42 frictionally engageable with the wall of plunger socket 44 for preventing withdrawal of said rod from said socket. Plunger valve 38 may be characterized as a slide valve which cooperates with a sleeve 46 to control operation of the present invention.

Reciprocably received in cylinder 20 is a pressure responsive movable wall or piston 48 which defines therein two variable volume chambers 50 and 52. This piston 48 is provided with an internal cavity which is divided into two compartments 54 and 56 by means of a pressure responsive diaphragm 58, and is comprised of two plates 60 and 62 which are peripherally joined together by means of a plurality of circumferentially spaced screws 63. This means of fastening the two plates together affords a convenient method of securing diaphragm 58 in position and to seal against fluid communication between the compartments 54 and 56. A packing 64 is secured to the outer periphery of piston 48 to provide an air tight seal on this piston between power chambers 50 and 52. Communication is provided between chamber 50 and compartment 56 by means of a passage 68, while communication between rear chamber 52 and front compartment 54 is provided by a passage 69 through the outer periphery of piston 48.

Although any desired type of differential fluid pressure power device may be used, I prefer to use a differential air pressure power cylinder of the vacuum type, in which the unit is "atmosphere-suspended" when released. Accordingly, chamber 52 and compartment 54 are permanently connected to the atmosphere, preferably through a conduit 70 connected to an air-cleaner 72 (see Figure 1). The rear of the power cylinder could be left open, but cover plate 76 and boot 78 are used to prevent dust and dirt from getting into the interior of the power cylinder.

Valve member 38 selectively controls the communication of compartment 56 (hence also chamber 50) with either the atmosphere in chamber 52, or the vacuum source, such as the usual intake manifold 80. In the position shown, compartment 56 is connected through port 82 in sleeve 46 (which is rigidly mounted in an extension 84 provided on the rear of piston plate 60) with the annular recess 86 formed between the lands 88 and 90 of valve member 38. Recess 86 is continuously in communication with the atmospheric pressure prevailing in the hollow center 92 of valve member 38 by means of ports 94. Vacuum is communicated to valve member 38 by means of a coiled rubber tube, or the like, 96 which opens through sleeve 46 into an annular chamber 98 formed between lands 88 and 100 on said valve 38. When rod 34 is forced to the right far enough to advance land 88 of the valve past the port 82, communication of the vacuum in annular chamber 98 is established to compartment 56.

Referring now to the particular construction of the diaphragm 58, it will be seen that this diaphragm is comprised of two eccentric rigid portions 102 and 104 interconnected by means of a flexible portion 106. Portion 102, which may hereafter be referred to as a primary reaction part or member, is composed of a pair of flat plates 108 which clamp therebetween the central portion of the diaphragm 58. The portion 104, which may hereafter be characterized as a secondary reaction part or member, consists of one annular rigid plate 110 and the outer peripheral portion 111 of an anti-flutter plate 112 which clamp therebetween the outer peripheral portion of diaphragm 58. The plate 112 is essentially flat, but the central section 113 is recessed or axially offset for a purpose which will be explained hereafter. A single tiny opening 115 is provided in this plate 112 to provide fluid communication to the primary reaction part 102.

A cushioning button 114 is carried by the central part of diaphragm portion 102 and is held in engagement with the right end of valve 38 by means of a coiled spring 116 which fits into the recessed plate portion 113. A frusto-conically shaped spring 118 is interposed between the outer portion 104 of diaphragm 58 and the rear wall of piston 48 so as to bias said outer portion oppositely to that of portion 102. This spring 118 provides a "counter-reaction force," which prevents the diaphragm portion 104 from exerting a reaction force against the operator during the initial force of the brake applying stroke. Diaphragm portion 102, having an initial engagement with the valve member 38, will exert a definite reaction force against the operator during the initial portion of the brake-applying action, which is proportional to the differential pressure prevailing over diaphragm 58. Once this differential pressure has attained a value which develops a force on diaphragm portion 104 sufficient to overcome the load of spring 118, portion 104 will move toward the left until the outer radial section 117 abuts against portion 102. When this occurs, the total reaction felt by the operator will be the sum of the forces produced by the two diaphragm portions 102 and 104. For convenient reference, as mentioned hereinbefore, since the portion 102 acts initially, this portion may be characterized as a primary reaction member and since the portion 104 acts subsequently it may be considered a secondary reaction member. In restating the above, the primary and secondary reaction parts of diaphragm 58, being relatively movable with respect to each other, will react separately and conjointly upon the operator in a predetermined manner according to the differential pressure prevailing over diaphragm 58. During the low initial differential pressures, only the primary reaction part 102 will react against the operator since the counter-reaction spring 118 prevents the secondary reaction part 104 from leaving its illustrated position. However, once this differential pressure reaches a predetermined value which produces a force on secondary reaction member 104 sufficient to overcome the opposite force of spring 118, it is obvious that this member 104 will move toward the left and integrate with the primary reaction part 102 by means of the rigid pickup section 117 on the anti-flutter plate 112. After such integration, the total force acting against the operator through the valve 38 and push rod 34 will be the aggregate forces exerted by the primary and secondary reaction parts 102 and 104 respectively. Thus it is seen, that a "two stage" reaction is provided which bears a definite relationship to the differential pressure acting on the diaphragm 58. This diaphragm action is termed "two stage" reaction since the initial reactionary force is proportionately smaller than the later reaction force as compared to the differential pressure which acts on the diaphragm.

A pressure-transmitting member projects through an opening in the front end 122 of cylinder 20 and into the pressure chamber of hydraulic cylinder 22. The left end of this rod 120 fits into a socket 124 centrally provided in piston 48. In order to hold the piston 48 in its illustrated released position, a coiled spring 126 is interposed between the front end 122 of power cylinder 20 and a retainer ring 128 suitably secured to the left end of rod 120. Thus the force of spring 126 is referred to piston 48 through the intermediary of the left end of the rod 120.

The hydraulic cylinder 22 is provided with an outlet port 130 through which the fluid pressure created in cylinder 22 may be communicated with the vehicle's brakes. A reservoir 132, used to replenish and compensate for loss of fluid from cylinder 22 or thermal variations in the volume of such fluid, has an outlet into cylinder 22 which is controlled by a compensating valve construction 134. This valve 134 has a depending stem projecting into the interior of cylinder 22 where it may be engaged by a flange 136 provided on the right end of rod 120. In the illustrated position, the rod 120 is tilting the valve 134 off its seat so that full communication is provided between reservoir 132 and the pressure chamber of cylinder 22. By moving rod 120 toward the right a distance sufficient to break the engagement between the rod flange 136 and the stem of valve 134, the sealing portion of this valve will completely sever the communication between the reservoir and the cylinder 22.

While it may be obvious from the foregoing description, rod 120 may be characterized as a volumetric plunger which, when moved to the right, will tend to decrease the volume of the pressure chamber of cylinder 22, thereby providing a means for pressurizing any hydraulic fluid in cylinder 22.

When the operator wishes to apply the brakes, he presses on treadle 28, thereby acting through rod 34 on valve member 38. Movement of the valve member toward the right causes air to be evacuated from chamber 50, thereby developing a pressure differential over power piston 48. The force on the power piston acts on pressure-transmitting member 120 in developing pressure in cylinder 22 and in the vehicle brake cylinders. The same pressure differential which acts on piston 48 also acts on diaphragm 58, but in the opposite direction. The force exerted by the diaphragm is, of course, less than that exerted by the power piston, because its effective area is smaller.

As mentioned earlier, contact between the primary reaction member 102 and the valve 38 is continuous, and the moment the above-mentioned evacuation begins, a differential pressure will be developed over the diaphragm 58. This differential pressure will act on the primary reaction member 102 with a force which is proportionate to its effective area. Thus, the operator experiences a "feel" or reaction from the first moment that he moves treadle 28. This reaction is controlled in its build-up by reason of the restricted communication of air from chamber 54 through the tiny opening 115 in plate 112. The plate 112 and the opening 115 may be compared with a "dash pot" which functions to resist rapid movement but which permits exacting controlled motion. In obtaining the most satisfactory "feel," it is preferred that the primary reaction member 102 act during the period of force required for the brake shoes to frictionally engage the drum. It is desirable that during this initial reaction stage, that the reaction force be relatively low as to correspond to the reaction force experienced by the operator of a conventional, non-power braking system in which the initial pedal travel takes up the usual shoe-to-drum clearance without the expenditure of much force. Thus by using the smaller diameter diaphragm portion 102 to provide the initial reaction feel, it is seen that a natural and true initial braking reaction can be obtained. Of course, after the shoes (in a conventional non-power system) have engaged the drum, more force must be exerted on the pedal to obtain the desired degree of braking deceleration. In conforming the present invention to this increase, at the end of the initial low-treadle-pressure stage, the pressure differential acting on the secondary reaction portion 104 compresses spring 118 sufficiently to bring the anti-flutter plate section 117 into engagement with the primary diaphragm part 102. This action effectively increases the reaction area of diaphragm 58 so that for further increases in differential pressure over piston 48, hence over diaphragm 58, the reaction felt by the operator on treadle 28 will be proportionately greater, this proportionate increase being the second stage of the "two-stage" reaction explained earlier. Further increases of pressure differential in the power cylinder are accompanied by increases in the reaction force which acts against the operator, and which must be overcome by the operator in order to intensify the brake-applying pressure. The "two-stage" reaction explained above provides a "feel" almost identical to that encountered in the best-designed manually-operated braking systems in which the initial pedal force required to overcome the brake return springs and the normal friction of the brake parts is very light in relation to the pedal force later required to provide braking deceleration.

The force exerted by the operator in resisting the force of the reaction diaphragm is added to the force of the power piston, and they conjoin in driving rod 120 into the hydraulic pressure chamber of cylinder 22. This is true, since the reaction force of the diaphragm 58, when counterbalanced by the force exerted by the operator tends to drive the piston 48, toward the right on its pressure stroke, thus making it obvious that the total force tending to drive piston 48 on its pressure stroke must be the sum of the differential pressure prevailing thereover and the pressure exerted by the operator in counterbalancing the diaphragm reaction.

The control valve has the usual follow-up action, since valve 38 slides in sleeve 46 which moves with power piston 48. As the power piston moves on its pressure stroke, it tends to overtake, and "lap" the valve control member, unless brake-applying movement of the treadle continues. Whenever the operator removes his force from the treadle, the control valve 38 is pushed back relative to piston 48 into the position in which chamber 50 communicates with the atmosphere, by reason of the force exerted by spring 116 through the button 114. The piston 48 is returned to release position by means of the spring 126.

If the operator wishes to add physical force, after the full force of the power unit has been developed, or, if there is a power failure, direct force can be exerted through valve 38 and cushioning button 114 against the central recessed portion 113 of anti-flutter plate 112 and the front power piston plate 138.

Figure 3:
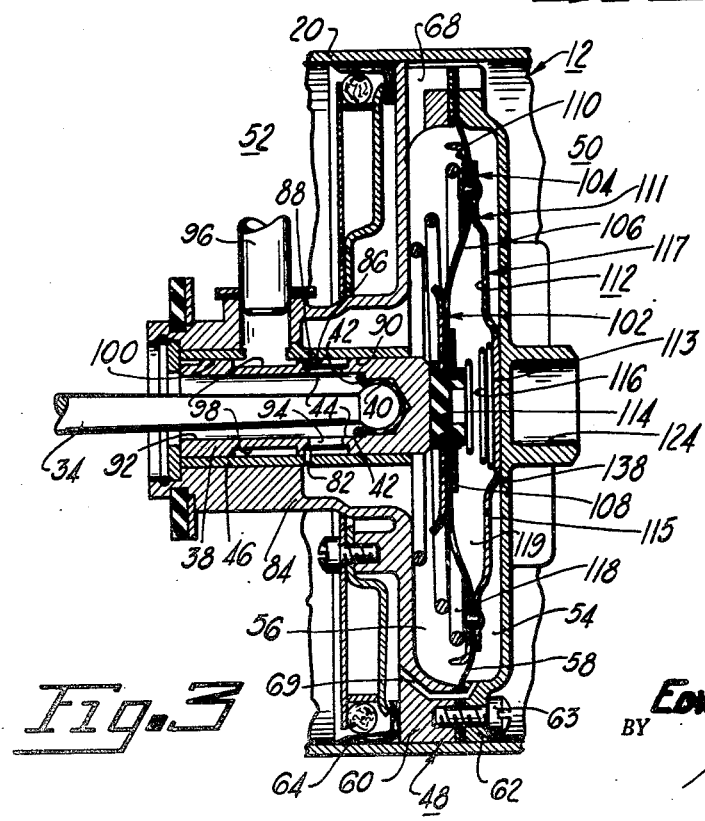
Figure 3 is an enlargement of a part of the master cylinder of Figure 2.

From the description thus far, it will be understood that the right-hand side of the primary reaction part 102 of the diaphragm 58 is substantially isolated from rapid changes in pressure by reason of the anti-flutter plate 112 and the tiny opening 115. Thus, any tendency to rapidly move the primary reaction part 102 toward the right or left from its illustrated position in Figure 3, will be resisted by an amount dependent upon the rate at which air can flow through the opening 115. Of course, the size of the opening 115 will determine this rate.

In explaining the function of the anti-flutter device 112, first let it be assumed that the opening 115 is quite large so as to allow free passage of air therethrough. Now, when the treadle 28 is operated to apply the brakes, the pressure differential described hereinbefore will be developed over both the piston 48 and the diaphragm 58. It may be considered that the creation of this pressure differential over the diaphragm 58 is quite sudden, i. e. vacuum is suddenly communicated to the chamber 56, whereupon the diaphragm 58 tends to suddenly move toward the left. In actual practice, this sudden movement may occur, and in doing so may force the valve member 38 sufficiently far to the left so as to uncover the port 82 and place it in communication with the atmosphere. This would, of course, destroy the vacuum condition previously established in chamber 56, and tend to move the operator's foot backwardly. Then, the natural weight and force of the operator's foot will move the valve 38 toward the right until vacuum communication is restored to chamber 56, whereupon the same cycle of forcing the valve 38 backwardly sufficiently to destroy the vacuum condition in chamber 56 will occur. Thus, it is seen that by reason of the operator's exertion of force on the treadle 28, and the weight of the operator's foot on the treadle 28, a "flutter" of the diaphragm portion 102 and the valve 38 may occur, this flutter being characterized in the rapid reciprocatory movement of the valve member 38 and the diaphragm portion 102 as an integral unit. This particular fluttering condition is known in the art as "horning" and results when a valve in a fluid pressure operated device continuously overshoots in seeking its lapped position.

By using the anti-flutter plate 112 and the tiny restriction 115, the tendency to "horn" or flutter is eliminated; consequently a consistent and reliable result in the operation of the control valve may be achieved at the will of the operator.

Initial operation of treadle 28 causes sudden movement of the valve member 38 and diaphragm portion 102 toward the right, and a reduction in the volume of chamber 119 which is formed between the plate 112 and the right-hand side of the diaphragm portion 102. During the reduction of volume of chamber 119, air must flow through the tiny opening 115. Now as a pressure differential is built-up over the diaphragm 58, the diaphragm portion 102 immediately tends to move to the left. Accompanying this tendency toward leftward movement, is the tendency toward expansion of the chamber 119, which is resisted by the restricted flow of air through the opening 115 into chamber 119. Thus, it is seen that the portion 102 of the diaphragm 58 cannot move suddenly in either direction under the effects of differential pressures. Hence the tendency of the valve 38 to hunt or flutter as it seeks its lapped position is entirely eliminated.

In determining the exact size of the opening 115, it should be observed that the opening should not be too small so as to unduly delay the development of the reactionary force of the primary reaction section 102 when the brakes are initially applied, nor too large so as to allow the generation of the objectionable flutter.

In the foregoing specification and in the appended claims, the identifying terms used are intended to convey meanings which include the range of equivalent elements. For example, the term "power cylinder" is intended to mean any casing or chamber having a pressure responsive movable member therein, whether such movable member be a piston, a diaphragm, or some other construction having the same function. Either of the terms "piston" or "diaphragm" embraces a rigid piston, a flexible diaphragm, or any other pressure responsive movable wall. The words "front" and "rear" and other words of direction are intended to have only relative connotation, for convenience in describing, and are not intended to be interpreted as requiring any particular orientation with respect to external elements.

Although only one embodiment of the invention has been illustrated and described, various changes in the form and relative arrangements of the parts may be made to suit requirements.

I claim:

1. A fluid pressure device comprising a power cylinder having a piston reciprocable therein, said piston having a hollow interior, a reaction diaphragm which divides said interior into first and second chambers, the first chamber being in communication with the rear of said piston and the second chamber being in communication with the front of said piston, a follow-up valve control member reciprocably mounted in the rear of said piston, said valve member having high and low pressure ports which control the operation of said power piston by virtue of movement of said valve member with respect to said piston, a first plate carried by said diaphragm centrally of the latter, a second plate also carried by said diaphragm in axial spaced relation to said first plate, said plates and contiguous interconnected flexible portions of the diaphragm defining the walls of a substantially closed "dashpot" chamber, said second plate having a restricted opening therethrough to provide a vent for said latter chamber, said second plate being disposed in said first chamber and having its central portion recessed toward and engageable with the front internal wall of said piston, a spring seated in said recessed portion and tending to urge said first plate toward said valve member, that portion of said second plate radially between said recessed central portion and the outer portion of said diaphragm being engageable with said first plate upon predetermined axial movement of the second plate toward said valve member whereupon both of said plates move as an integral unit, a counter-reaction spring interposed between the radially outer portion of the diaphragm and said piston in a manner such as to urge said radially outer portion of said second plate out of operative engagement with said first plate, and a manually operable member arranged to act on said valve member to control its movements and to transfer the actuating force exerted on said manually operable member to said piston.

2. A fluid pressure device comprising a power cylinder having a piston reciprocable therein, said piston having a hollow interior, a reaction diaphragm which divides said interior into first and second chambers, the first chamber being in communication with the rear of said piston and the second chamber being in communication with the front of said piston, a follow-up valve control member reciprocably mounted in the rear of said piston, said valve member having high and low pressure ports which control the operation of the power piston by virtue of movement of said valve member with respect to said piston, a first plate carried by said diaphragm centrally of the latter, a second plate also carried by said diaphragm in axial spaced relation to said first plate, said plates and contiguous interconnected flexible portions of the diaphragm defining the walls of a substantially closed chamber, one of said walls having a restricted opening therethrough to provide a vent for said latter chamber, a spring interposed between said plates and tending to urge said first plate toward said valve member, said second plate having a portion adapted to engage said first plate upon predetermined axial movement of the second plate toward said valve member whereupon both plates move as an integral unit, a counter-reaction spring interposed between the radially outer portion of said diaphragm and said piston in a manner such as to urge said second plate out of operative engagement with said first plate, and a manually operable member arranged to act on said valve member to control its movements and to transfer the actuating force exerted on said manually operable member to said piston.

3. A fluid pressure device comprising a power cylinder having a piston reciprocable therein, said piston having a hollow interior, a reaction diaphragm which divides said interior into first and second chambers, the first chamber being in communication with the rear of said piston and the second chamber being in communication with the front of said piston, a follow-up valve control member reciprocably mounted in the rear of said piston, said valve member having high and low pressure ports which control the operation of said power piston by virtue of movement of said valve member with respect to said piston, a first plate carried by said diaphragm substantially centrally of the latter and adapted to exert a counter-reaction force on said valve member, a second plate also carried by said diaphragm in axial spaced relation to said second plate, said plates and contiguous interconnected flexible portions of said diaphragm defining the walls of a substantially closed chamber, means providing a restricted vent for said latter chamber, said second plate being adapted to engage said first plate upon predetermined axial movement of the second plate toward said valve member whereupon both plates move as an integral unit, and a manually operable member arranged to act on said valve member to control its movements and to transfer the actuating force exerted on said manually operable member to said piston.

4. A fluid pressure device comprising a power cylinder, a pressure-responsive movable wall in said cylinder, said wall having a hollow interior, a reaction diaphragm which divides said interior into first and second chambers, the first chamber being in communication with the rear of said wall and the second chamber being in communication with the front of said wall, a valve member for controlling the operation of said wall, a first plate carried by said diaphragm and adapted to exert a counter-reaction force on said valve member, a second plate also carried by said diaphragm in axial spaced relation to said first plate, said plates and the contiguous interconnected flexible portions of said diaphragm defining the walls of a substantially closed chamber, means providing a restricted vent for said latter chamber, said second plate being adapted to engage said first plate upon predetermined axial movement of said second plate in response to a reaction differential pressure across said diaphragm whereupon both plates move as an integral unit, and operator operated means for controlling said valve member.

5. A fluid pressure device comprising a power cylinder, a pressure-responsive movable wall in said cylinder, said wall having a hollow interior, a reaction diaphragm dividing said interior into first and second chambers, the first chamber being in communication with one side of said wall and the second chamber being in communication with the opposite side of said wall, a valve member associated with said movable wall, for controlling the operation of said movable wall by virtue of movement of said valve member with respect to said wall, a first reaction member carried by said diaphragm and adapted to exert a reaction force on said valve member, a second reaction member also carried by said diaphragm in axial spaced relation to said first reaction member, said reaction members in conjunction with said diaphragm defining the walls of a substantially closed chamber, means providing a restricted vent for said latter chamber, said second reaction member being adapted to engage said first reaction member upon predetermined axial movement of said second reaction member in response to a reaction differential pressure across said diaphragm whereupon both reaction members move as a unit, and operator operated means for controlling said valve member.

6. A fluid pressure device comprising a differential pressure power cylinder, a pressure-responsive movable wall in said cylinder, a pressure responsive reaction means carried by said movable wall and arranged to exert a force proportional to that exerted by said movable wall but in the opposite direction, a valve control member carried by said movable wall, said reaction means being composed of relatively movable primary and secondary reaction means which may be operatively conjoined to act as a single unit, and an anti-flutter device for said primary reaction means and carried by said secondary reaction means, said anti-flutter device serving to restrict the communication of fluid to one part of said primary reaction means, said secondary reaction means being operatively engageable with said primary reaction means when the aforementioned differential pressure attains a predetermined value to exert a reaction force on said valve control member in addition to the reaction force of said primary reaction means.

7. A fluid pressure device comprising a differential pressure power cylinder, a pressure responsive movable wall in said cylinder, pressure responsive reaction means arranged to exert a reaction force as a function of the force exerted by said wall upon a power stroke of the latter, an operator operated valve control member for controlling the operation of said wall, said reaction means comprising relatively movable primary and secondary reaction devices, said primary reaction device producing a reaction force against the operator for predetermined low values of differential pressures across said power cylinder and said secondary reaction device coacting with said primary device to increase the reaction force for higher values of differential pressures, and means for preventing a hunting or fluttering reaction force build-up including fluid-flow restricting means for damping sudden movements of the primary reaction device.

8. A pressure producing device comprising a power cylinder, a pressure responsive movable wall in the power cylinder, a pressure responsive reaction means arranged to exert a reaction force which bears a relationship to the force exerted by the movable wall, an operator operated valve means for controlling the differential pressure acting on the movable wall and the reaction means, and means for transmitting the reaction force of said reaction means to the operator, said reaction means including a first member for producing a first reaction force against the operator upon initial actuation of the valve means and a second member spaced apart from the first member and forming therewith a chamber containing a fluid, and means tending to prevent valve flutter including means for restricting fluid flow between the interior of the chamber and the exterior thereof, said second member being arranged to exert a second reaction force against the operator after the force exerted by the movable wall reaches a given value.

9. A pressure producing device as claimed in claim 8, wherein said means controlling flow between the interior of the chamber and exterior thereof comprises a restricted opening or flow passage provided in one of said members forming said chamber.

<center>No references cited.</center>